(12) United States Patent
Uchida

(10) Patent No.: US 6,256,718 B1
(45) Date of Patent: Jul. 3, 2001

(54) PROTOCOL-BASED MEMORY SYSTEM FOR INITIALIZING BUS INTERFACES USING DEVICE IDENTIFIERS AFTER MEMORY SIZES ARE INCREASED

(75) Inventor: Katsunori Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/190,238

(22) Filed: Nov. 13, 1998

(30) Foreign Application Priority Data

Nov. 14, 1997 (JP) .................................... 9-331201

(51) Int. Cl.[7] ...................................................... G06F 12/00
(52) U.S. Cl. ........................ 711/172; 711/171; 711/217; 711/218
(58) Field of Search .................................... 711/172, 171, 711/218, 217

(56) References Cited

U.S. PATENT DOCUMENTS 6,003,110 * 12/1999 Brandt et al. .......................... 711/172
6,058,464 *  5/2000 Taylor .................................... 711/218

FOREIGN PATENT DOCUMENTS 9-293015  11/1997 (JP) .
9-293393  11/1997 (JP) .

* cited by examiner

Primary Examiner—Do Yoo
Assistant Examiner—Vu A. Pham
(74) Attorney, Agent, or Firm—McGinn & Gibb, PLLC

(57) ABSTRACT

When memory size is increased by a factor of $2^N$ (where N is an integer equal to or greater than unity) in a protocol-based memory system where a memory controller and multiple bus interfaces are interconnected via a bus, there exists a mismatch of N bits between the address format of each bus interface and that of the memory controller. In an initialization method for the memory system, one of the bus interfaces is enabled and request packets are transmitted successively from the memory controller to the enabled bus interface. Each packet contains a unique device identifier for identifying each bus interface. The packets of successive $2^N$ arrivals are received at the enabled bus interface and an identifier for this bus interface is established using the device identifier contained in a predetermined one of the received packets by ignoring one or more device identifiers contained in other $2^N-1$ received packets. An adjacent one of the bus interface is then enabled, instead of the previously enabled bus interface.

19 Claims, 5 Drawing Sheets

| | | | |
|---|---|---|---|
| "7" | 1 | 1 | 1 |
| "6" | 1 | 1 | 0 |
| "5" | 1 | 0 | 1 |
| "4" | 1 | 0 | 0 |
| "3" | 0 | 1 | 1 |
| "2" | 0 | 1 | 0 |
| "1" | 0 | 0 | 1 |
| "0" | 0 | 0 | 0 |

SKIPPED DEVICE ID / DROPPED BITS

| | | | | |
|---|---|---|---|---|
| "15" | 1 | 1 | 1 | 1 |
| "14" | 1 | 1 | 1 | 0 |
| "13" | 1 | 1 | 0 | 1 |
| "12" | 1 | 1 | 0 | 0 |
| "11" | 1 | 0 | 1 | 1 |
| "10" | 1 | 0 | 1 | 0 |
| "9" | 1 | 0 | 0 | 1 |
| "8" | 1 | 0 | 0 | 0 |
| "7" | 0 | 1 | 1 | 1 |
| "6" | 0 | 1 | 1 | 0 |
| "5" | 0 | 1 | 0 | 1 |
| "4" | 0 | 1 | 0 | 0 |
| "3" | 0 | 0 | 1 | 1 |
| "2" | 0 | 0 | 1 | 0 |
| "1" | 0 | 0 | 0 | 1 |
| "0" | 0 | 0 | 0 | 0 |

SKIPPED DEVICE ID'S / DROPPED BITS

| | | | | | |
|---|---|---|---|---|---|
| "31" | 1 | 1 | 1 | 1 | 1 |
| "30" | 1 | 1 | 1 | 1 | 0 |
| "29" | 1 | 1 | 1 | 0 | 1 |
| "28" | 1 | 1 | 1 | 0 | 0 |
| "27" | 1 | 1 | 0 | 1 | 1 |
| "26" | 1 | 1 | 0 | 1 | 0 |
| "25" | 1 | 1 | 0 | 0 | 1 |
| "24" | 1 | 1 | 0 | 0 | 0 |
| "23" | 1 | 0 | 1 | 1 | 1 |
| "22" | 1 | 0 | 1 | 1 | 0 |
| "21" | 1 | 0 | 1 | 0 | 1 |
| "20" | 1 | 0 | 1 | 0 | 0 |
| "19" | 1 | 0 | 0 | 1 | 1 |
| "18" | 1 | 0 | 0 | 1 | 0 |
| "17" | 1 | 0 | 0 | 0 | 1 |
| "16" | 1 | 0 | 0 | 0 | 0 |
| "15" | 0 | 1 | 1 | 1 | 1 |
| "14" | 0 | 1 | 1 | 1 | 0 |
| "13" | 0 | 1 | 1 | 0 | 1 |
| "12" | 0 | 1 | 1 | 0 | 0 |
| "11" | 0 | 1 | 0 | 1 | 1 |
| "10" | 0 | 1 | 0 | 1 | 0 |
| "9" | 0 | 1 | 0 | 0 | 1 |
| "8" | 0 | 1 | 0 | 0 | 0 |
| "7" | 0 | 0 | 1 | 1 | 1 |
| "6" | 0 | 0 | 1 | 1 | 0 |
| "5" | 0 | 0 | 1 | 0 | 1 |
| "4" | 0 | 0 | 1 | 0 | 0 |
| "3" | 0 | 0 | 0 | 1 | 1 |
| "2" | 0 | 0 | 0 | 1 | 0 |
| "1" | 0 | 0 | 0 | 0 | 1 |
| "0" | 0 | 0 | 0 | 0 | 0 |

SKIPPED DEVICE ID'S / DROPPED BITS

PROTOCOL-BASED MEMORY SYSTEM FOR INITIALIZING BUS INTERFACES USING DEVICE IDENTIFIERS AFTER MEMORY SIZES ARE INCREASED

BACKGROUND OF THE INVENTION

1. Field of the Invention

The present invention relates generally to semiconductor memories, and more specifically to protocol-based dynamic random-access memories such as Rambus dynamic RAMs.

2. Description of the Related Art

Protocol-based dynamic random-access memories developed by Rambus Inc. are considered to be a representative of future technologies for personal computers because of a number of beneficial features, among which high speed performance is most attractive. In a Rambus memory system, dynamic RAMs are connected via a bus to a master device, the master device sends packets in a predetermined address format to a destination bus interface that interfaces to the associated dynamic RAM. This address format varies with the size of each RAM.

When it is desired to reconfigure the memory system, some of the memories of default size are assembled into a memory of larger size. This reconfiguration is unknown to the master device, or memory controller. When the reconfigured memory system is then initialized to update the device identifiers of the bus interfaces, discrepancies occur in address format between the memory controller and the bus interfaces. As a result, part of the identifier bits sent from the memory controller is discarded and same identifiers are assigned to different bus interfaces.

SUMMARY OF THE INVENTION

It is therefore an object of the present invention to provide a protocol-based memory system that can uniquely assign device identifiers in an initialization process performed after the memories of default size are reconfigured without modifications on the memory controller.

According to a first aspect of the present invention, there is provided a memory system comprising a plurality of memories, a plurality of bus interfaces respectively associated with the memories, and a memory controller connected to the bus interfaces via a bus for successively transmitting request packets to the bus during an initialization phase of the memory system, each of the packets including a unique device identifier for identifying each of the bus interfaces. Each of the bus interfaces, when enabled, receives the packets of at least two successive arrivals, establishes an identifier of the bus interface using the device identifier contained in a predetermined one of the received packets by ignoring one or more of the device identifiers contained in the other packets, and enables an adjacent one of the bus interface after the bus interface has received all of said request packets.

According to a second aspect, the present invention provides a method for initializing a semiconductor memory system when memory size is increased by a factor of $2^N$, where N is an integer equal to or greater than unity, wherein the memory system comprises a memory controller and a plurality of memories and a plurality of bus interfaces respectively associated with the memories, there being a mismatch of N bits between address format of each of the bus interfaces and address format of the memory controller, the method comprising the steps of (a) enabling one of the bus interfaces and successively transmitting request packets from the memory controller to the enabled bus interface, each of the packets including a unique device identifier for identifying each of the bus interfaces, (b) receiving the packets of successive $2^N$ arrivals at the enabled bus interface, (c) establishing an identifier of the enabled bus interface using the device identifier contained in a predetermined one of the received packets and ignoring the device identifier contained in other $2^N-1$ received packets, and (d) enabling an adjacent one of the bus interface, instead of the bus interface which is enabled by the step (a).

BRIEF DESCRIPTION OF THE DRAWINGS

The present invention will be described in further detail with reference to the accompanying drawings, in which:

FIGS. 9A, 9B and 9C are illustrations of a number of memory reconfigurations of the present invention for universal applications, indicating two-fold, four-fold and eight-fold memory expansion, respectively.

DETAILED DESCRIPTION

Before proceeding with the detailed description of the present invention, it may prove helpful to provide an explanation of the prior art with reference to FIGS. 1 to 4.

Figure 1:
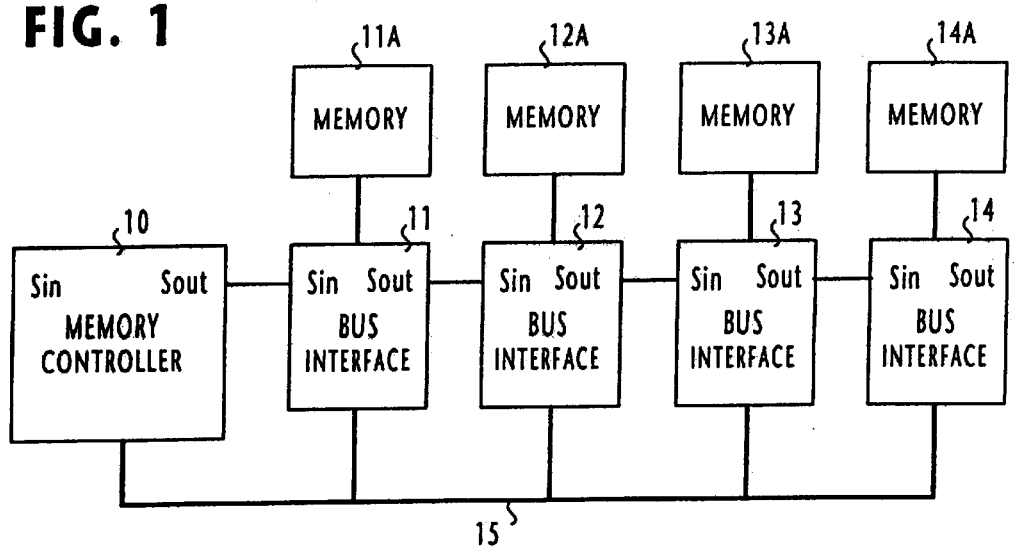
FIG. 1 is a block diagram of a Rambus memory system.

As shown in FIG. 1, the Rambus memory system includes a memory controller (master device) 10 and a plurality of Rambus bus interfaces 11 to 14 which provide interfacing between the controller 10 and associated Rambus dynamic RAMs (or RDRAMs) 11A to 14A via a multi-bit wide bus 15. Each bus interface has a serial input port (Sin) and a serial output port (Sout), the output port of each bus interface is connected to the input of the next interface in a daisy-chain fashion. These input and output ports are used only for initialization of the memories.

According to the Rambus protocol, access from the memory controller 10 to any of the memories is by the transmission of a request packet (read/write) and a data packet over the bus 15. On receipt of a request packet, the interface of the destination memory returns an acknowledgement to the memory controller 10. If the request is a write operation, the memory controller sends a data packet containing write data to the memory, and if the request is a read operation, the bus interface returns a data packet containing requested read data. All packet transmissions are performed in a clock synchronous mode.

Figure 2:
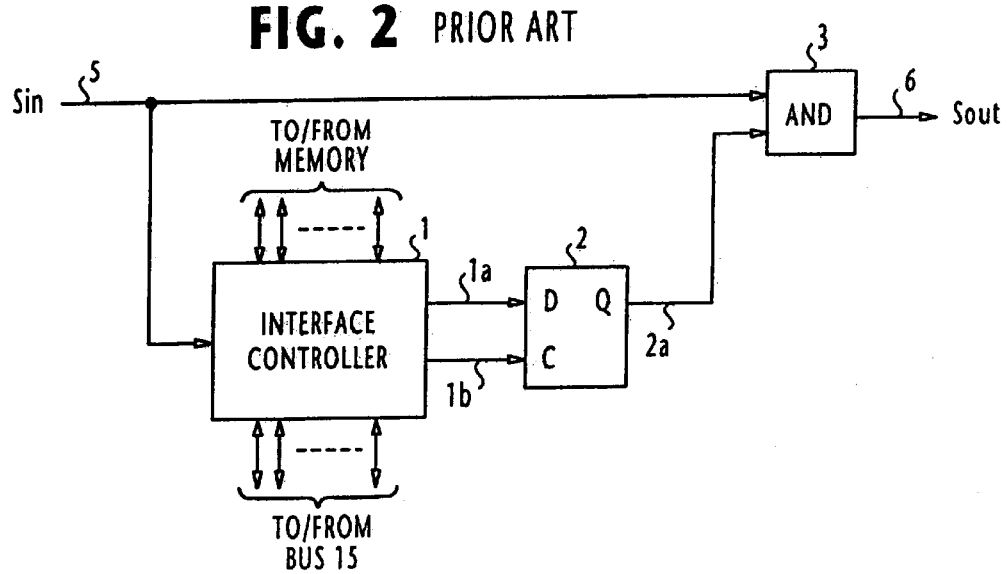
FIG. 2 is a block diagram of a prior art Rambus bus interface.

As shown in detail in FIG. 2, each bus interface includes an interface controller 1, a flip-flop or latch 2 having D and clock (C) inputs and connected to the controller 1 and a Q output connected to a first input of an AND gate 3 whose second input is connected to the serial input port 5 and its output to the serial output port 6. Interface controller 1 is also connected to the serial input port 5 and to the bus 15 as well as to the associated memory.

Figure 3:
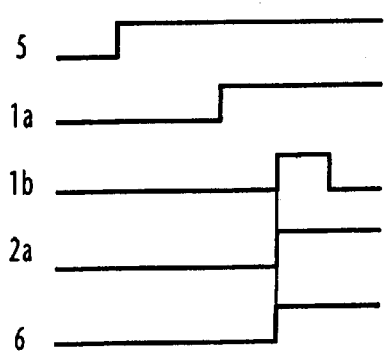
FIG. 3 is a timing diagram associated with the block diagram of FIG. 2.

Before initialization, the serial output ports of all bus interfaces are set to low level, Initialization begins with the memory controller 10 asserting a high level at its serial output port as shown in FIG. 3, thus enabling the bus interface 11 to return a receive-ready packet to the memory controller 10. In response, the memory controller 10 sends an initialization request packet to the bus interface 11 to set a unique device identifier into the controller of this interface.

If all RDRAMs are 16-megabyte memories and if a device identifier "111" (i.e., a decimal 7) were to be set into the bus interface 11, the request packet will contain bits "111" in bit positions [23:21] of the address field [25:21] which is assigned to memories of the 16-megabyte type and the controller 1 receives this packet and sets its device identifier to decimal "7". With the device identifier being set, the controller 1 sets its output lead 1a to the D input of latch 2 to high level and then applies a pulse to its output terminal 1b leading to the clock input of latch 2. The Q output of latch 2, or lead 2a, thus goes high immediately following the rising edge of the pulse. Since the serial input port 5 is at high level, the AND gate 4 applies a high level to the serial output port 6, thus enabling the bus interface 12 to accept the next initialization request packet from the memory controller 10 so that a device identifier of decimal "6" is set. In this way, other bus interfaces 13 and 14 will be respectively initialized with unique device identifiers "5" and "4" in sequence.

The request packet has address bit positions [35:0], which are divided into a plurality of address fields according to different memory sizes. Five-bit address fields [24:20], [25:21] and [26:22], for example, are assigned to 8-, 16- and 32-megabyte memories, respectively, for representing their device identifiers. If two or more memories are assembled into a single RDRAM, the device identifiers of the component memories are used to identify the RDRAM. Since all transactions use request packets and data packets, same packet formats and port configurations can be used regardless of their capacity.

Figure 4:
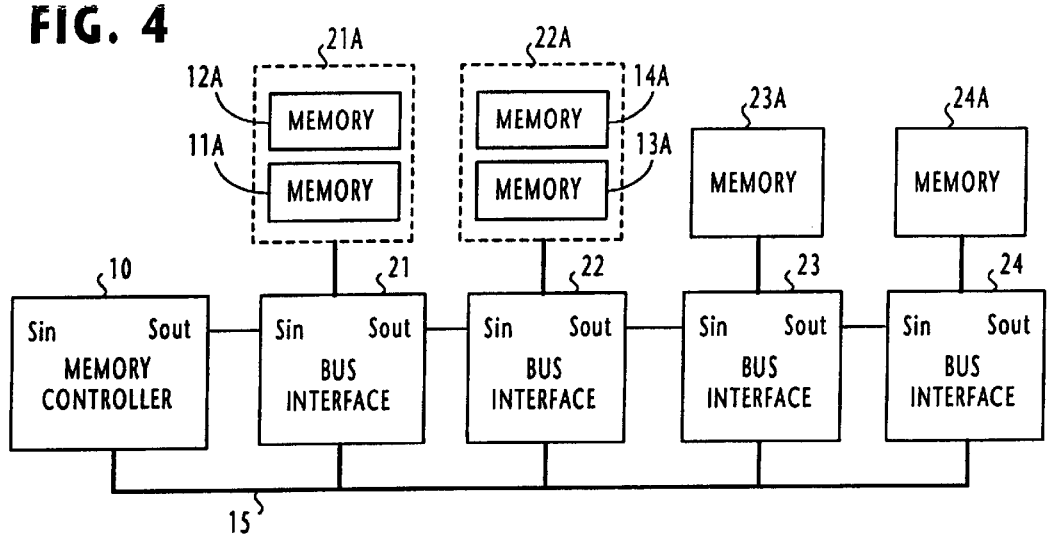
FIG. 4 is a block diagram of a Rambus memory system when the memory configuration is changed.

Assume that the memory size is increased by assembling two 16-megabyte memories into a single 32-megabyte RDAM module and two of such modules 21A and 22A are connected to the bus through associated Rambus bus interfaces 21 and 22, and additonal bus interfaces 23 and 24 are provided as shown in FIG. 4. Bus interfaces 23 and 24 are respectively associated with 32-megabyte memories 23A and 24A, respectively giving a total memory size twice as much as the previous size. Since the 32-megabyte memory modules are assigned the address field [26:2], instead of the address field [25:21] of the 16-megabyte memory, the controller 1 of each bus interface changes its address space to the 32-megabyte format. However, since the memory controller 10 is not informed of this fact, it still uses the 16-megabyte format when sending a request packet.

Therefore, when the bus interface 21 is first enabled during initialization, the request packet from memory controller 10 is in the 16-megabyte address format containing a device identifier "111". Bus interface 21 regards it as a 32-megabyte format packet and drops the lower significant bit "1" of the identifier "111" of the address bit position [23:21], resulting in a device identifier "11" being set into bus interface 21. Similarly, when the bus interface 22 is enabled and memory controller 10 sends a second initialization packet containing a device identifier "110", the lower bit "0" is dropped off and the interface 22 is set with the same device identifier "11" as the interface 21. In like manner, the bus interfaces 23 and 24 are initialized with the same device identifiers "10" when they are supplied with identifiers "101" and "100", respectively, from the memory controller 10.

Figure 5:
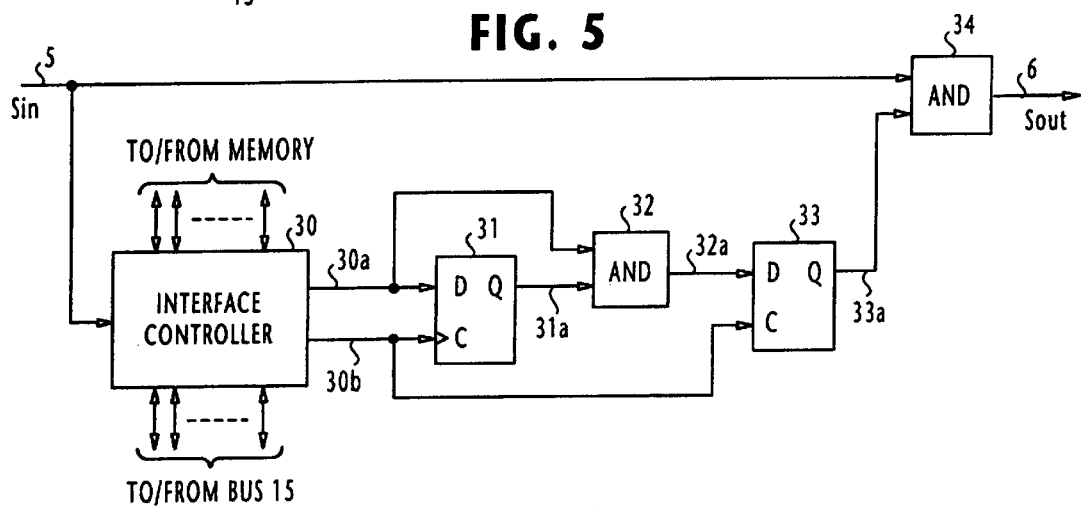
FIG. 5 is a block diagram of a bus interface according to the present invention for the memory system of FIG. 4.

In order to avoid this problem, each of the bus interfaces 21 to 24 of the prior art Rambus memory system is modified as shown in FIG. 5. As illustrated, the bus interface of the present invention has an interface controller 30, flip-flops 31 and 33, and AND gates 32 and 34. Interface controller 30 has two output terminals 30a and 30b respectively connected to the D and clock inputs of flip-flop 31. The Q output of flip-flop 31 changes to the binary level of its D input in response to the falling edge of a positive-going pulse that is supplied to its clock input C from the controller. The Q output of flip-flop 31 is applied through lead 31a to the AND gate 32 to which the output terminal 30a of the controller is also connected. The output of AND gate 32 is coupled through lead 32a to the D input of flip-flop 33. Flip-flop 33 has its clock input C coupled to the controller's output terminal 30b. The Q output of flip-flop 33 changes to the binary level of its D input in response to the leading edge of the positive-going pulse at the clock input C of this flip-flop. AND gate 34 logically combines signals from the serial input port 5 and the Q output flip-flop 33.

Interface controller 30 provides interfacing between the memory controller 10 and the associated 32-megabyte memory module into which two 16-megabyte memories, for example, are assembled, and performs initialization with the memory controller 10 via the serial input and output ports 5 and 6.

Figure 6:
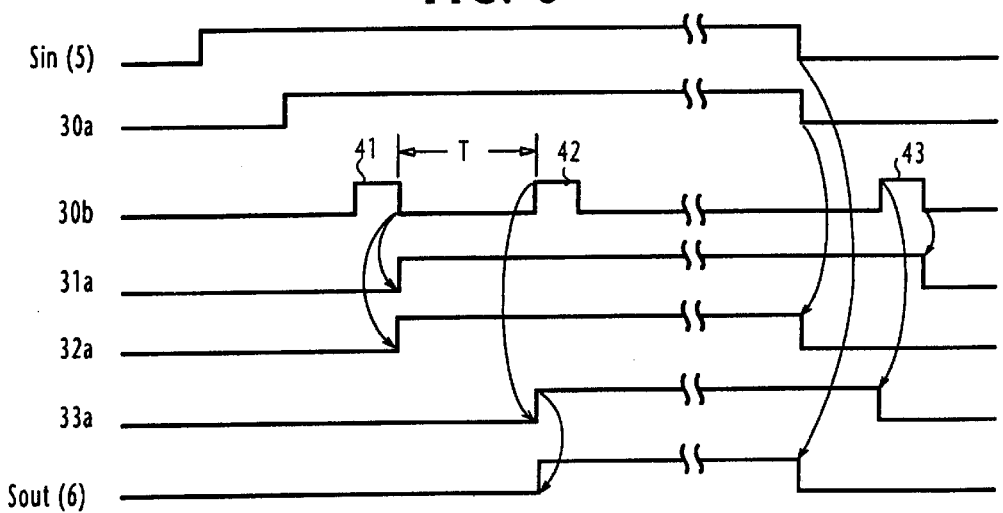
FIGS. 6 and 7 are timing diagrams associated with the block diagram of FIG. 5.

The operation of the bus interface 21 of FIG. 5 will be described with reference to the timing diagram shown in FIG. 6 by assuming that the memory controller 10 produces device identifiers "111", "110", "101" and "100" after the bus interface 21 is enabled.

When the bus interface 21 is enabled in response to the serial input port 5 being set to high level, the interface controller 30 of this interface receives an initialization request packet from the memory controller 10 and performs a number of necessary initialization processes. This request packet is one the 16-megabyte format and contains the device identifier "111" in the address bit positions [23:21].

After the initialization processes are complete, the controller 30 sets the output terminal 30a to high level and begins the setting of its device identifier using the device identifier bits "111" contained in the received request packet. Since the address space of interface controller 30 has been reconfigured to the 32-megabyte format, the lower bit "1" is dropped, leaving the higher bits "11" set into the bus interface 21.

With the device identifier being set, the controller 30 outputs a positive-going pulse 41 to its output terminal 30b. Thus, the Q output of flip-flop 31 changes to high level corresponding to the high level of its D input in response to the trailing edge of the pulse 41.

Since the leads 30a and 31a are at high level, the AND gate 32 is activated, producing a high level output on lead 32a. Interface controller 30 supplies a second pulse 42 to its output terminal 30b. This causes the flip-flop (latch) 33 to respond to the leading edge of the pulse 42 by switching its Q output on lead 33a to high level. Therefore, the AND gate 34 is activated, setting the serial output port 6 to high level.

Note that the interval T between the first and second pulses 41 and 42 corresponds to the interval in which the prior art bus interface 12 was supplied with the device identifier "110". In the present invention, the memory controller 10 sends a second initialization request to the bus 15 during the interval T, containing the device identifier "110". Since the bus interface 21 has completed its initialization and maintains the enabled state during this interval T, while the interface 22 is still not enabled, this request packet is received by the interface 21, but discarded. During the interval T, the bus interface 21 informs the memory controller 10 of the fact that it has reconfigured its packet format to the 32-megabyte format to cause the memory controller to change its address format to that of the bus interface 21.

With the serial output port 6 of interface 21 being set high in response to the second pulse 42 as mentioned above, the bus interface 22 is now enabled to accept the third initialization request that contains the device identifier "101". Since the controller 30 of the interface 22 discards the lowermost bit "1", it is initialized with a device identifier "10". Bus interface 22 then ignores the fourth request containing the device identifier "100" during the interval T of this interface. In this way, when the bus interfaces 23 and 24 are successively enabled, they discard the sixth and eighth request packets so that, when they are supplied with device identifiers "001" and "000" from the memory controller 10, they are initialized with device identifiers "01" and "00", respectively.

Figure 7:
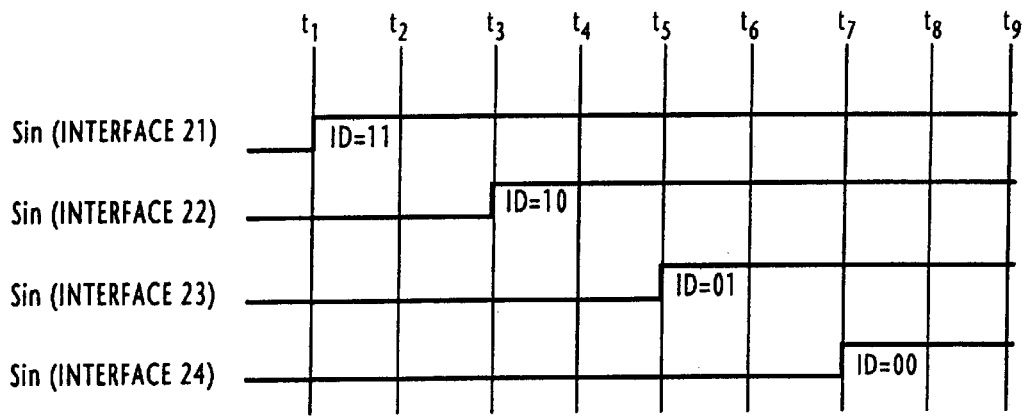

It is seen in FIG. 7 that the bus interfaces 21, 22, 23 and 24 are successively enabled at times $t_1$, $t_3$, $t_5$ and $t_7$, and they are set with unique identifiers "11", "10", "01" and "00" during the interval between $t_1$–$t_2$, $t_3$–$t_4$, $t_5$–$t_6$, $t_7$–$t_8$.

When all the bus interfaces have been initialized, the serial input port 5 of the interface 21, and hence its serial output port 6, goes low. In response, the interface controller 30 of each of bus interfaces 21 to 24 sets their output terminal 30a to low level, causing the output 32a of the AND gate 32 to go low, and then produces a third positive-going pulse 43 to its output terminal 30b. In response to the leading and trailing edges of the pulse 43, the Q outputs of flip-flops 33 and 31 successively switch to low level, resetting the flip-flops 31 and 33.

Figure 8:
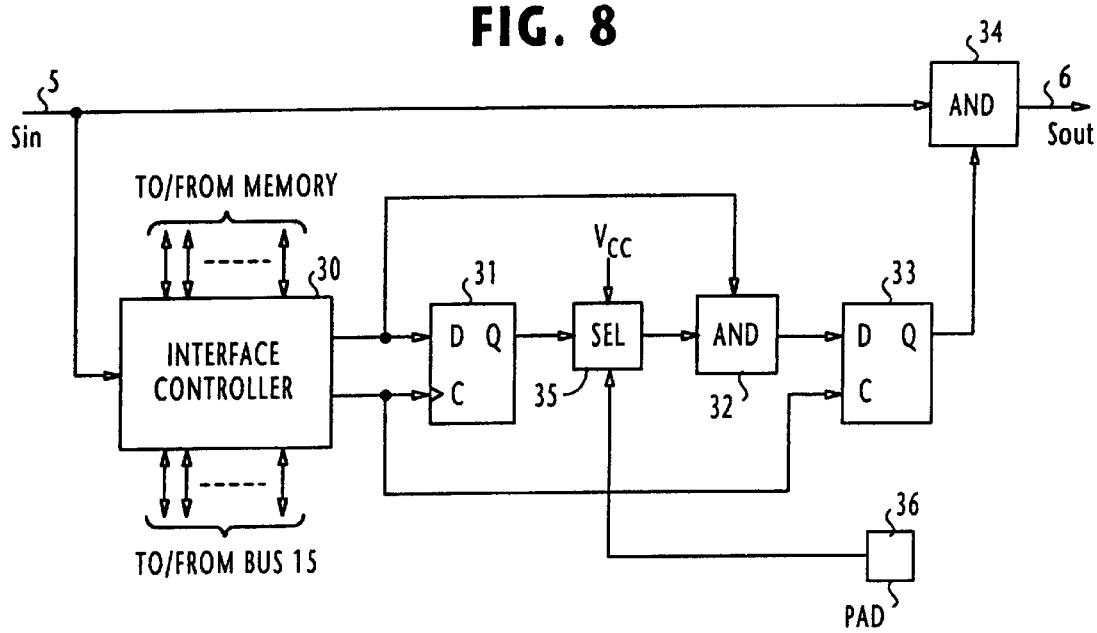
FIG. 8 is a block diagram of a modified bus interface of the present invention.

FIG. 8 is a modified form of the embodiment of FIG. 5. This modification includes a selector 35 connected in the path from the output of flip-flop 31 to the AND gate 32 for coupling a voltage $V_{CC}$ or the output of flip-flop 31 to the AND gate 32, depending on a voltage applied to a bonding pad 36. Selector 35 is fabricated on a wiring layer (specifically, the A1 layer) of a semiconductor chip.

When the memory system is operated on a default mode, i.e., the bus interfaces 11 to 14 are connected as illustrated in FIG. 1, the voltage Vcc is applied to the AND gate 32, instead of the output of flip-flop 31, by applying a low voltage (ground potential) to the bonding pad 36. In this case, bus interfaces operate in the same manner as that shown in FIG. 2. The selector 35 is switched for coupling the output of flip-flop 31 to the AND gate 32 by applying a voltage $V_{DD}$ to the bonding pad 36 when the memory system is reconfigured as illustrated in FIG. 4. In this case, each bus interface operates in the same manner as that of FIG. 5.

While mention has been made of an embodiment in which the memory size is increased by a factor of 2, the present invention can equally be used for applications where the memory size is increased by a factor 4 or 8.

FIG. 9A summarises the operation of the above-mentioned embodiment where the lowermost bit of each device identifier is dropped off and every other device identifiers are skipped by each bus interface. It is seen that if a memory size is increased by a factor of $2^N$ (where N is equal to 1, 2 or 3), the lowermost N bit(s) of device identifier is lost and $2^N-1$ device identifiers are skipped after an identifier of first arrival is received by each bus interface.

FIG. 9B illustrates the operation of a memory expansion by a factor of 4. In this case, when the first bus interface receives a first request packet containing an identifier "1111" (decimal "15"), it discards the lower bits "11" and selects the higher bits "11" as its device identifier. Following this, the first bus interface ignores subsequent three packets so that identifiers "1110", "1101" and "1100" are skipped. The second to fourth bus interfaces are thus set with identifiers "10", "01" and "00", respectively.

FIG. 9C illustrates the operation of a memory expansion by a factor of 8. In this case, when the first bus interface receives a first request packet containing an identifier "11111" (decimal "31"), it discards the lower bits "111" and selects the higher bits "11" as its device identifier. Following this, the first bus interface ignores subsequent seven packets so that identifiers "11110", "11101", "11100", "11011", "11010", "11001" and "11000" are skipped. The second to fourth bus interfaces are thus set with identifiers "10", "01" and "00", respectively.

Figure 10:
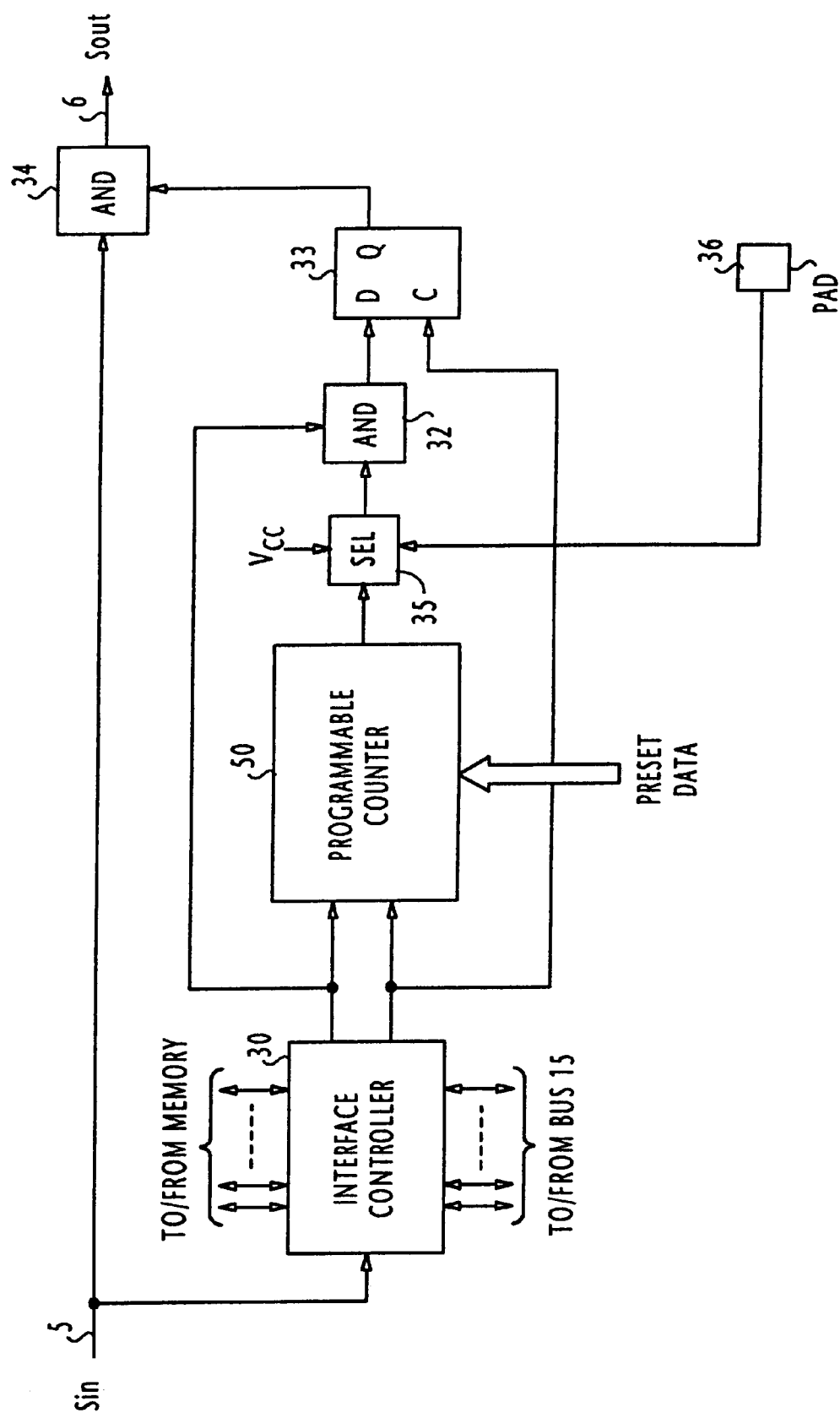
FIG. 10 is a block diagram of a bus interface suitable for the universal application of the present invention.

Each of the bus interfaces of FIG. 4 may be modified as shown in FIG. 10 so that it can be universally used for different memory size reconfigurations. A programmable counter 50 is used, instead of the flip-flop 31 of FIG. 5. This counter has a preset input to which preset data is supplied from an external source to set a desired memory expansion factor N.

What is claimed is:

1. A semiconductor memory system comprising:
   a plurality of memories;
   a plurality of bus interfaces respectively associated with said memories; and
   a memory controller connected to said bus interfaces via a bus for successively transmitting request packets to said bus during an initialization phase of the memory system, each of said packets including a unique device identifier for identifying each of said bus interfaces,
   each of said bus interfaces receiving said packets of at least two successive arrivals when the bus interface is enabled, establishing an identifier of the bus interface using the device identifier contained in a predetermined one of the received packets and ignoring one or more of the device identifiers contained in the other packets, and enabling an adjacent one of said bus interfaces after the bus interface has received all of said request packets.

2. A semiconductor memory system as claimed in claim 1, wherein each of said packets has an address format of a memory size which is different from a memory size of each of said memories, and wherein each of said bus interfaces is arranged to inform the memory controller of the memory size of the associated memory after said identifier of the bus interface is established.

3. A semiconductor memory system as claimed in claim 2, wherein each of said bus interfaces includes:
   an interface controller for successively producing a first pulse and a second pulse when the bus interface is enabled;
   a first bistable device for establishing an active state in response to said first pulse; and
   a second bistable device for enabling an adjacent one of said bus interfaces in response to receipt of said second pulse in the presence of the active state of the first bistable device.

4. A semiconductor memory system as claimed in claim 3, further comprising a logic gate connected between said first and second bistable devices for causing said second bistable device to be reset to an inactive state in response to a third pulse from said interface controller, said first bistable device being reset to an inactive state in response to said third pulse.

5. A semiconductor memory system as claimed in claim 4, further comprising a selector connected between said first bistable device and said logic gate for applying a fixed voltage to said logic gate when the memory system is initialized in a default mode and establishing a connection between said first bistable device and the logic gate when the memory system is initialized after each of said memories is reconfigured.

6. A semiconductor memory system as claimed in claim 2, wherein each of said bus interfaces includes:
   an interface controller for successively producing pulses when the bus interface is enabled; and
   programmable counter circuitry for counting said pulses and enabling an adjacent one of said bus interfaces when a predetermined number of said pulses are counted.

7. A semiconductor memory system as claimed in claim 6, wherein said interface controller is arranged to produce an output when the bus interface of the interface controller is enabled and a series of pulses, and wherein said programmable counter circuitry includes:
   a programmable counter for counting said pulses and producing a counter output when the number of the counted pulses reaches an externally preset value; and
   a bistable device for establishing an active state in response to said counter output in the presence of said output produced by the interface controller and enabling said adjacent one of said bus interfaces as long as the bistable device is in said active state.

8. A semiconductor memory system as claimed in claim 7, wherein said interface controller is arranged to remove said output and produce a reset pulse following said series of pulses, further comprising a logic gate for causing said bistable device to be reset to an inactive state in response to said reset pulse.

9. A semiconductor memory system as claimed in claim 6, further comprising a selector connected between said programmable counter and said logic gate for applying a fixed voltage to said logic gate when the memory system is initialized in a default mode and establishing a connection between said programmable counter and the logic gate when the memory system is initialized after each of said memories is reconfigured.

10. A semiconductor memory system as claimed in claim 1, wherein each of said bus interfaces includes:
   an interface controller for successively producing a first pulse and a second pulse when the bus interface is enabled;
   a first bistable device for establishing an active state in response to said first pulse; and
   a second bistable device for enabling an adjacent one of said bus interfaces in response to receipt of said second pulse in the presence of the active state of the first bistable device.

11. A semiconductor memory system as claimed in claim 10, further comprising a logic gate connected between said first and second bistable devices for causing said second bistable device to be reset to an inactive state in response to a third pulse from said interface controller, said first bistable device being reset to an inactive state in response to said third pulse.

12. A semiconductor memory system as claimed in claim 11, further comprising a selector connected between said first bistable device and said logic gate for applying a fixed voltage to said logic gate when the memory system is initialized in a default mode and establishing a connection between said first bistable device and the logic gate when the memory system is initialized after each of said memories is reconfigured.

13. A semiconductor memory system as claimed in claim 1, wherein each of said bus interfaces includes:
   an interface controller for successively producing pulses when the bus interface is enabled; and
   programmable counter circuitry for counting said pulses and enabling an adjacent one of said bus interfaces when a predetermined number of said pulses are counted.

14. A semiconductor memory system as claimed in claim 13, wherein said interface controller is arranged to produce an output when the bus interface of the interface controller is enabled and a series of pulses, and wherein said programmable counter circuitry includes:
   a programmable counter for counting said pulses and producing a counter output when the number of the counted pulses reaches an externally preset value; and
   a bistable device for establishing an active state in response to said counter output in the presence of said output produced by the interface controller and enabling said adjacent one of said bus interfaces as long as the bistable device is in said active state.

15. A semiconductor memory system as claimed in claim 14, wherein said interface controller is arranged to remove said output and produce a reset pulse following said series of pulses, further comprising a logic gate for causing said bistable device to be reset to an inactive state in response to said rest pulse.

16. A semiconductor memory system as claimed in claim 15, further comprising a selector connected between said programmable counter and said logic gate for applying a fixed voltage to said logic gate when the memory system is initialized in a default mode and establishing a connection between said programmable counter and the logic gate when the memory system is initialized after each of said memories is reconfigured.

17. A method for initializing a semiconductor memory system which comprises a plurality of memories and a plurality of bus interfaces respectively associated with said memories, the method comprising:
   a) enabling one of said bus interfaces and successively transmitting request packets to the enabled bus interface, each of said packets including a unique device identifier for identifying each of said bus interfaces;
   b) receiving said packets of successive arrivals at the enabled bus interface;
   c) establishing an identifier of the enabled bus interface using the device identifier contained in a predetermined one of the received packets and ignoring the device identifier contained in one or more of other received packets; and
   d) enabling an adjacent one of said bus interface, instead of the bus interface which is enabled by the step (a).

18. A method as claimed in claim 17, wherein each of said packets has an address format of a memory size which is different from a memory size of each of said memories, further comprising matching an address format of each of said packets to the memory size of each of said memories after said identifier of the enabled bus interface is established.

19. A method for initializing a semiconductor memory system when memory size is increased by a factor of $2^N$, where N is an integer equal to or greater than unity, wherein said memory system comprises a memory controller and a plurality of memories and a plurality of bus interfaces respectively associated with said memories, there being a mismatch of N bits between address format of each of said bus interfaces and address format of said memory controller, the method comprising:

a) enabling one of said bus interfaces and successively transmitting request packets from said memory controller to the enabled bus interface, each of said packets including a unique device identifier for identifying each of said bus interfaces;

b) receiving said packets of successive 2 arrivals at the enabled bus interface;

c) establishing an identifier of the enabled bus interface using the device identifier contained in a predetermined one of the received packets and ignoring the device identifier contained in $2^N-1$ received packets; and d) enabling an adjacent one of said bus interface, instead of the bus interface which is enabled by the step (a).

* * * * *